US008914633B1

(12) United States Patent
Cook et al.

(10) Patent No.: US 8,914,633 B1
(45) Date of Patent: Dec. 16, 2014

(54) SYSTEMS AND METHODS FOR VALIDATING CLIENT AUTHENTICATION USING PROTECTED TIMING DATA

(75) Inventors: Paul Cook, Birchgrove (AU); Scott Hopwood, Pymble (AU); Anthony Langsworth, Concord West (AU)

(73) Assignee: Symantec Corporation, Mountain View, CA (US)

(*) Notice: Subject to any disclaimer, the term of this patent is extended or adjusted under 35 U.S.C. 154(b) by 245 days.

(21) Appl. No.: 13/188,344

(22) Filed: Jul. 21, 2011

(51) Int. Cl.
*H04L 29/06* (2006.01)

(52) U.S. Cl.
USPC .......................................................... 713/168

(58) Field of Classification Search
CPC ..... H04L 9/3247; H04L 63/08; H04L 9/3297; H04L 2463/121; G06F 21/30; G06F 21/44
See application file for complete search history.

(56) References Cited

U.S. PATENT DOCUMENTS

| 2002/0184509 | A1 | 12/2002 | Scheidt et al. | |
|---|---|---|---|---|
| 2004/0107252 | A1* | 6/2004 | Futa et al. | 709/204 |
| 2007/0249288 | A1* | 10/2007 | Moallemi et al. | 455/68 |
| 2008/0250147 | A1* | 10/2008 | Knibbeler et al. | 709/229 |
| 2009/0254975 | A1 | 10/2009 | Turnbull et al. | |
| 2010/0022254 | A1 | 1/2010 | Ashfield et al. | |

FOREIGN PATENT DOCUMENTS

WO 2006103387 10/2006

OTHER PUBLICATIONS

Website: http://en.wikipedia.org/wiki/Location-based_authentication, Location-based authentication, Apr. 1, 2011 (2 pgs.).
Website: http://www.cs.georgetown.edu/~denning/infosec/Grouding.text, Denning, Dorothy E. and MacDoran, Peter F., Location-Based Authentication: Grounding Cyberspace for Better Security, Computer Fraud & Security, Feb. 1996 (6 pgs.).

* cited by examiner

*Primary Examiner* — Izunna Okeke
(74) *Attorney, Agent, or Firm* — Holland & Hart LLP (57) ABSTRACT

A computer-implemented method for validating client authentication using timing data is described. A connection request is received from a client. Data are transmitted to the client. The client is instructed to retransmit the data. The retransmitted data are received from the client. Timing data that indicates a time to transmit the data to the client and receive the retransmitted data from the client are calculated. A protective element is applied to the timing data.

11 Claims, 11 Drawing Sheets

SYSTEMS AND METHODS FOR VALIDATING CLIENT AUTHENTICATION USING PROTECTED TIMING DATA

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Computing systems may be required to be authenticated before being allowed access to certain data, services, functions, etc. A computing system may be authenticated by a user providing certain credentials, such as, a user name and/or a password. These credentials, however, may be compromised by a malicious entity. As a result, the malicious entity may provide the credentials and gain access to the data, services, functions, etc. The malicious entity may access protected information and/or interfere with the performance of a computing system.

SUMMARY

According to at least one embodiment, a computer-implemented method for validating client authentication using timing data is described. A connection request is received from a client. Data are transmitted to the client. The client is instructed to retransmit the data. The retransmitted data are received from the client. Timing data that indicate a time to transmit the data to the client and receive the retransmitted data from the client are calculated. A protective element is applied to the timing data.

In one configuration, the protective element is a digital signature. In one example, the digitally signed timing data may be transmitted to the client. In one embodiment, the digitally signed timing data may be transmitted to a timing verification server. The timing verification server may determine whether the timing data fall within a predetermined range of timing data.

A validation token may be received with the connection request. The validation token may be associated with the client that sent the connection request. A connection with an issuing server that generates validation tokens may be established. In one configuration, the received validation token may be verified with the issuing server. A key value pair may be transmitted to the client. The key value pair may be protected by the digital signature. In one example, the key value pair may include a validation token associated with the client and the timing data.

A computing device configured to validate client authentication using timing data is also described. The computing device may include a processor and memory in electronic communication with the processor. The computing device may further include a timing calculating module stored in the memory configured to receive a connection request from a client and transmit data to the client. The client may be instructed to retransmit the data. The timing calculating module may be further configured to receive the retransmitted data from the client and calculate timing data that indicate a time to transmit the data to the client and receive the retransmitted data from the client. The module may be further configured to apply a protective element to the timing data.

A computer-program product to validate client authentication using timing data is further described. The computer-program product may include a non-transitory computer-readable medium having instructions thereon. The instructions may include code programmed to receive a connection request from a client and code programmed to transmit data to the client. The client may retransmit the data. The instructions may also include code programmed to receive the retransmitted data from the client and code programmed to calculate timing data that indicate a time to transmit the data to the client and receive the retransmitted data from the client. The instructions may further include code programmed to apply a protective element to the timing data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Providers of electronic products, services, and data are moving these items to cloud computing. Cloud computing may refer to the provision of computational resources on demand via a computer network. In the traditional model of computing, both data and software are fully contained on a user's computer. In cloud computing, however, the user's computer may contain almost no software or data, serving as little more than a display terminal for processes occurring on a network of computers remotely located to the user's computer. The cloud computing service may be referred to as the "cloud".

Cloud or Internet-based resources may require authentication of the computers attempting to access the resources to prevent misuse of the resources. For example, a user's computer may access resources in the cloud if the user provides the required credentials on the user's computer. If the correct credentials are provided, the user's computer may use these credentials to access the resources stored in the cloud. Examples of credentials may include user names and passwords. Although common, user names and passwords may be easily intercepted or copied, often without the owner's knowledge. Malicious users may use these credentials to access otherwise protected information and resources stored in the cloud. Malicious users in relatively close proximity to the original user (i.e., the owner of the compromised credentials) may be difficult to detect. Malicious users, however, that are not located in close proximity to the original user may be detectable because the computer(s) used by the malicious user may be located in a network different than the network used by the original user.

In one embodiment, the present systems and methods may validate client authentication using network traffic round trip times. To detect credential misuse, the present systems and methods may instruct a requester of the resources in the cloud to contact multiple timing servers over the Internet. The multiple timing servers may time the round trip time of communications between the requested and the timing servers. The timing servers may return the timing data in a tamper evident, source authenticated form to the requested. Unexpected timings may indicate that the requester is using an unexpected network, which implies the request may be rejected or stronger credentials may be required before access to the resources is granted. In one configuration, the present systems and methods may work through firewall configurations for operating systems and web browsers. In addition, the present systems and methods may calculate and return the timing data within a relatively short period of time (e.g., a few seconds) to not frustrate users attempting to access the resources in the cloud.

Figure 1:
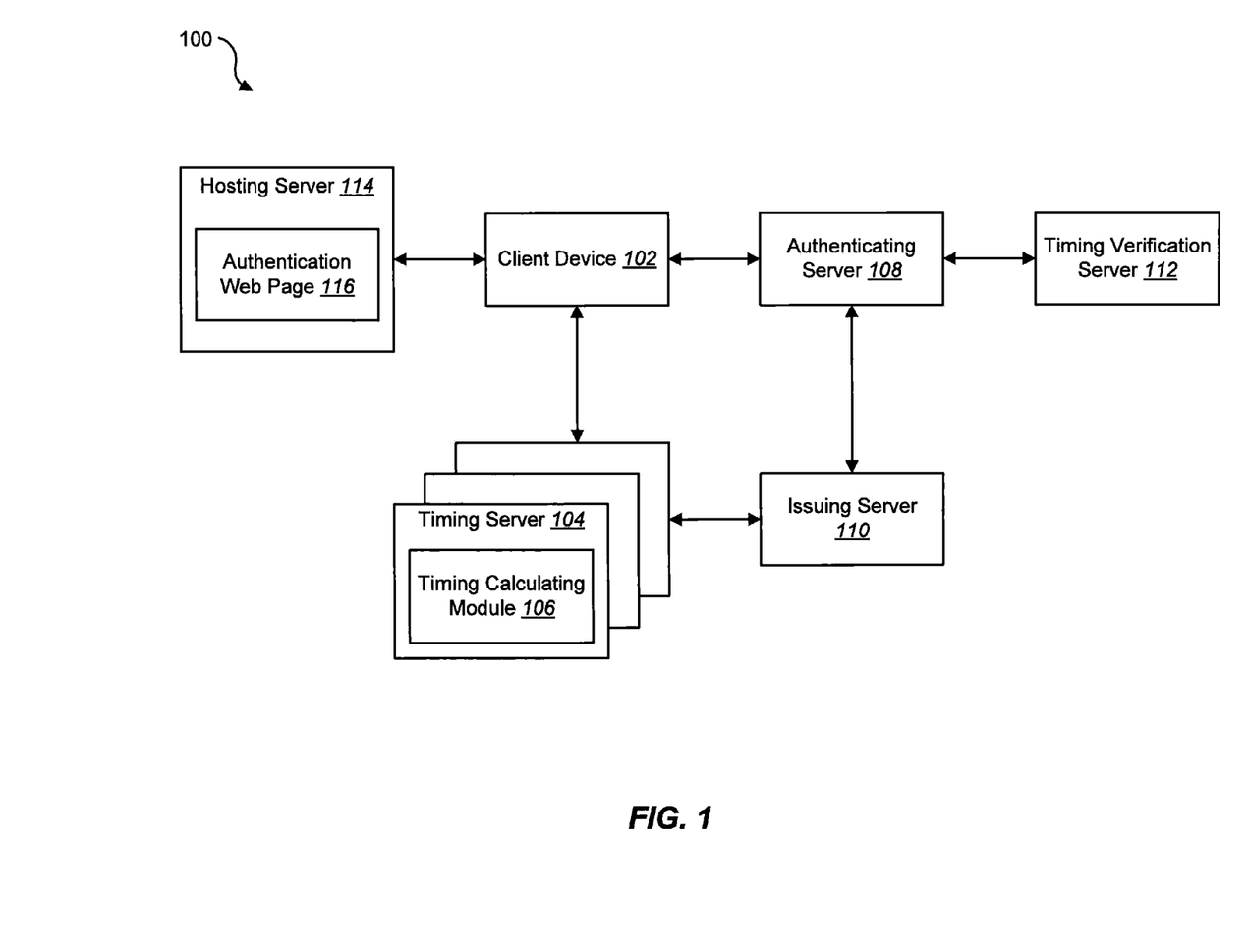
FIG. 1 is a block diagram illustrating one embodiment of an environment in which the present systems and methods may be implemented.

FIG. 1 is a block diagram illustrating one embodiment of an environment 100 in which the present systems and methods may be implemented. In one configuration, a client device 102 may attempt to access resources or data stored in the cloud. Before gaining access to these resources and/or data, the client device 102 may be authenticated and verified. In one example, a user of the client device 102 may be authenticated by providing certain credentials, such as, but not limited to, a user name and password to an existing authentication system. After the user has been authenticated by providing the correct credentials, the system illustrated in FIG. 1 may be used to verify the user. As used herein, the client device 102 may refer to a computer that is accessed and used by an individual user of a network, or a personal computer of an individual. The client device 102 may be a standalone computer, such as a personal computer (PC), a laptop, a tablet, a smartphone, a personal digital assistant (PDA), a wireless device that may be used to access data through a network, or any other type of computing device.

In one configuration, an authenticating server 108 may connect to an issuing server 110 to request a validation token. The validation token may be used to identify and verify the client device 102. The validation token may also be used for reporting and billing purposes. In one embodiment, the validation token may be random data, such as, but not limited to, a random number that uniquely identifies the client device 102 that is attempting to be verified.

In one example, the authenticating server 108 may also redirect the client device 102 to an authentication web page 116 hosted on a hosting server 114. Based on information provided by the authentication web page 116, the client device 108 may connect to one or more timing servers 104. The timing server 104 may verify the validation token of the client device 108 with the validation tokens generated by the issuing server 110. The timing servers 104 may each include a timing calculating module 106. The module 106 may calculate timing data relating to the round trip time required for communications to take place between the client device 102 and a respective timing server 104. The timing servers 104 may transmit timing data to the client device 102 via the authentication web page 116. The timing data may be posted to the authenticating server 108 and then passed to a timing verification server 112. The server 112 may analyze the timing data to determine whether the client device 102 is a verified device that is authorized to gain access to resources stored in the cloud. Details regarding the above verification process will be provided below.

Figure 2:
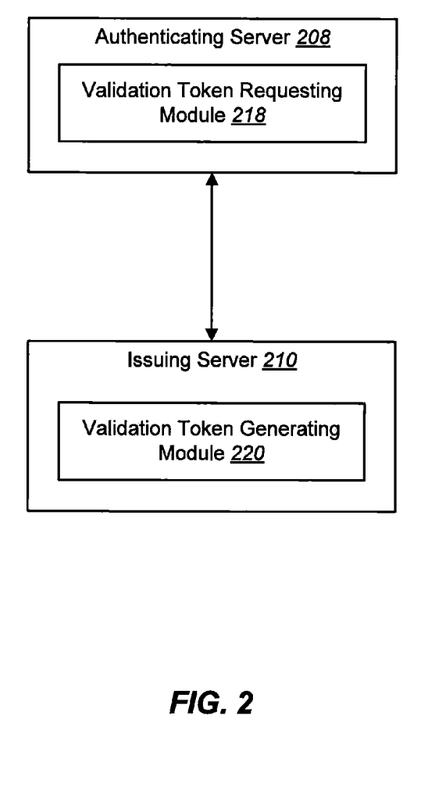
FIG. 2 is a block diagram illustrating one embodiment of an authenticating server and an issuing server in accordance with the present systems and methods.

FIG. 2 is a block diagram illustrating one embodiment of an authenticating server 208 and an issuing server 210 in accordance with the present systems and methods. In one example, the authenticating server 208 may include a validation token requesting module 218. As explained above, after the client device 102 is authenticated using an existing authentication system (e.g., providing a user name and password), the authenticating server 208 may establish communications with the issuing server 210. The requesting module 218 may request a validation token that uniquely identifies the client device 102. The issuing server 210 may include a validation token generating module 220 that generates the validation token requested by the authenticating server 208.

Figure 3:
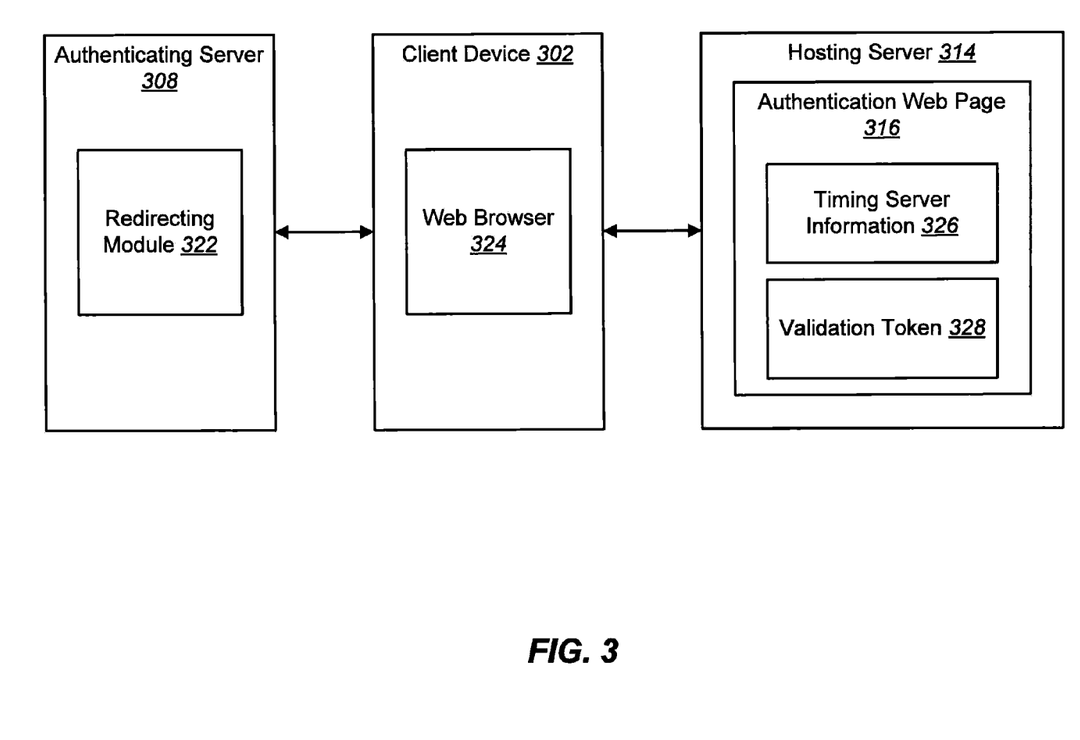
FIG. 3 is a block diagram illustrating one embodiment of an authenticating server redirecting a client device to an authentication web page in accordance with the present systems and methods.

FIG. 3 is a block diagram illustrating one embodiment of an authenticating server 308 redirecting a client device 302 to an authentication web page 316 in accordance with the present systems and methods. In one configuration, the authenticating server 308 may include a redirecting module 322 that redirects a web browser 324 running on the client device 302 to an authentication web page 316. The web page 316 may be hosted by a hosting server 314. In one example, the authentication web page 316 may include timing server information 326 and a validation token 328. The timing server information 326 may include a random subset of available timing servers 104 for connection with the client device 302. In one embodiment, providing a subset of timing servers in the timing server information 326 may mitigate a client device spoofing slower connection speeds by randomizing which timing servers the correct speed should be known. The validation token 328 may be the same token previously generated by the issuing server 110, as previously described.

Figure 4:
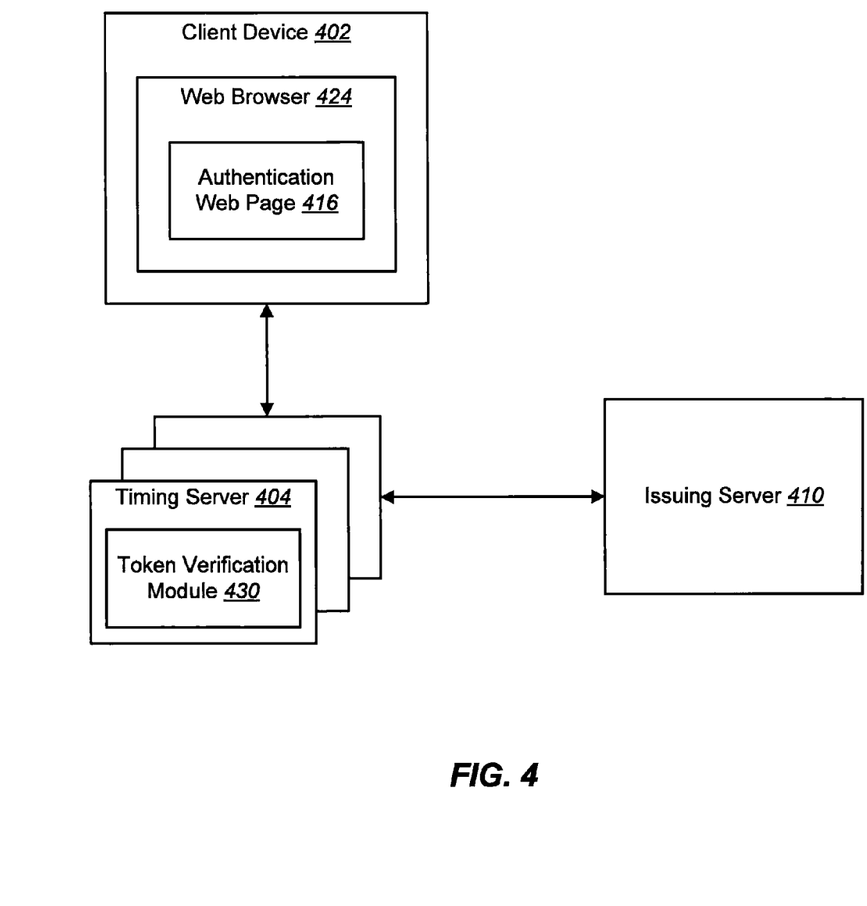
FIG. 4 is a block diagram illustrating one embodiment of a client device communicating with one or more timing servers in accordance with the present systems and methods.

FIG. 4 is a block diagram illustrating one embodiment of a client device 402 communicating with one or more timing servers 404 in accordance with the present systems and methods. In one example, the client device 402 includes a web browser 424 that accesses an authentication web page 416. The authentication web page 416 may facilitate the connection between the client device 402 and the one or more timing servers 404. For example, the web page 416 may include JavaScript (or other web browser executable code) that allows each timing server 404 to be contacted in parallel via a Hyper-Text Transfer Protocol (HTTP) GET request. Contacting each timing server 404 in parallel may result in the fastest response time back to the client device 402.

In one configuration, the authentication web page 416 may provide the validation token 328 for authentication as an argument to the one or more timing servers 404. Each timing server 404 may include a token validation module 430. The module 430 may receive the validation token from the authentication web page 416 and communicate with an issuing server 410 to verify the validation token. In other words, the issuing server 410 stores a validation token that uniquely identifies the client device 402. The token verification module 430 may compare the token received from the web page 416 with the token stored by the issuing server 410. If the tokens match, the validation token provided by the web page 416 may be verified. Validating the token may ensure that only authorized client devices 402 may receive timing data, as will be described below.

Figure 5:
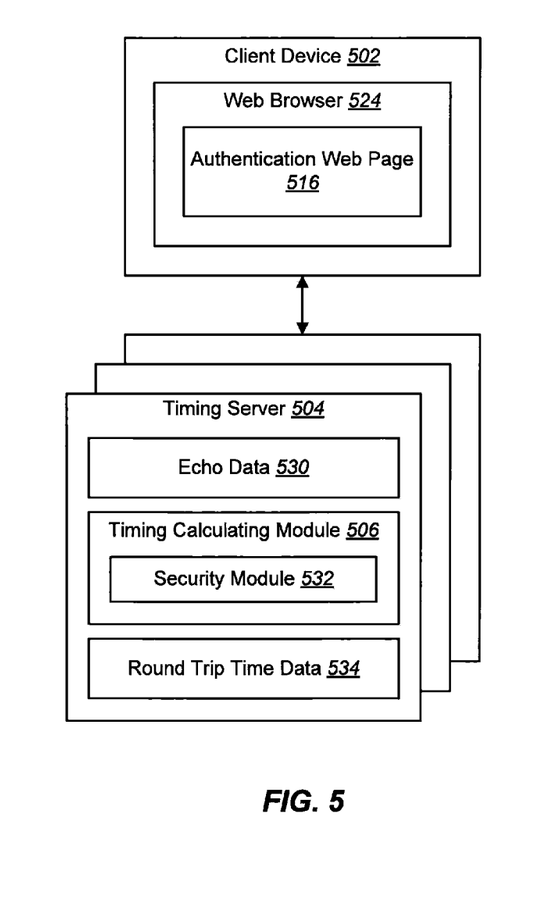
FIG. 5 is a block diagram illustrating a further embodiment of a client device communicating with one or more timing servers.

FIG. 5 is a block diagram illustrating a further embodiment of a client device 502 communicating with one or more timing servers 504, in accordance with the present systems and methods. As previously explained, the client device 502 may include a web browser 524 that accesses an authentication web page 516. The web page 516 may contact the one or more timing servers 504 to establish communications between the timing servers 504 and the client device 502.

The timing servers 504 may generate random echo data 530 that are transmitted to the client device 502. The echo data 530 may be echoed by the client device 502. In other words, the echo data 530 may be transmitted to the client 502 and the client may be required to send back to the timing servers 504 the echo data 530. In one configuration, the client device 502 may connect back to the timing servers 504 as soon as possible via an HTTP GET request, which may include the echo data 530 and the validation token 328 associated with the client device 502. The process of a timing server 504 transmitting and receiving echo data 530 to and from the client device 502 may be repeated several times.

Transmitting and receiving the echo data 530 may prevent the client device 502 from being able to spoof (i.e., fool) a faster connection speed with the timing servers 504 because the echo data 530 may be random and, as a result, unpredictable. In one configuration, the client device 502 may spoof a slower connection by delaying the response that includes the echo data 530. This, however, may be mitigated by randomizing the timing servers 504, as explained above. In one example, because the client device 502 initiates the connection with the timing servers 504, the client 502 may not be required to expose ports through intervening firewalls.

The timing servers 504 may also each include a timing calculating module 506. The module 506 may calculate round trip time data 534 that indicate an average or mean time for the echo data 530 to be transmitted to the client device 502 and received back from the device 502. The timing calculating module 506 may include a security module 532 that may incorporate various security measures and protections for the round trip time data 534. In one embodiment, the security module 532 may include a digital signature for the respective timing server 504. For example, once the timing of transmission and receipt of echo data 530 has been completed for the client device 502, the round trip time data 534 may be calculated and returned to the client device 502 as a series of key value pairs protected by the timing server's 504 digital signature. The key value pairs protected by the digital signature may include the validation token associated with the client device 502 and the round trip time data 534.

In one configuration, protecting the key value pairs with the digital signature of the respective timing server 504 may prevent spoofing and may also serve to authenticate the source of the timing (i.e., the timing servers 504). In addition, inclusion of the validation token may prevent replay attacks. In one configuration, Coordinated Universal Time (UTC) may be added if additional mitigation is required. In addition to the validation token and the round trip time data 534, additional key value pairs may be added to the response from each timing server 504 to the client device 502. For example, the timing servers 504 may include a field indicating whether the Internet Protocol (IP) address of the client device 502 is a known source of electronic spam or malware. Further, a Security Assertion Markup Language (SAML) token may be included with the key value pairs and may be passed to a Relying Party Secure Token Service (STS).

Figure 6:
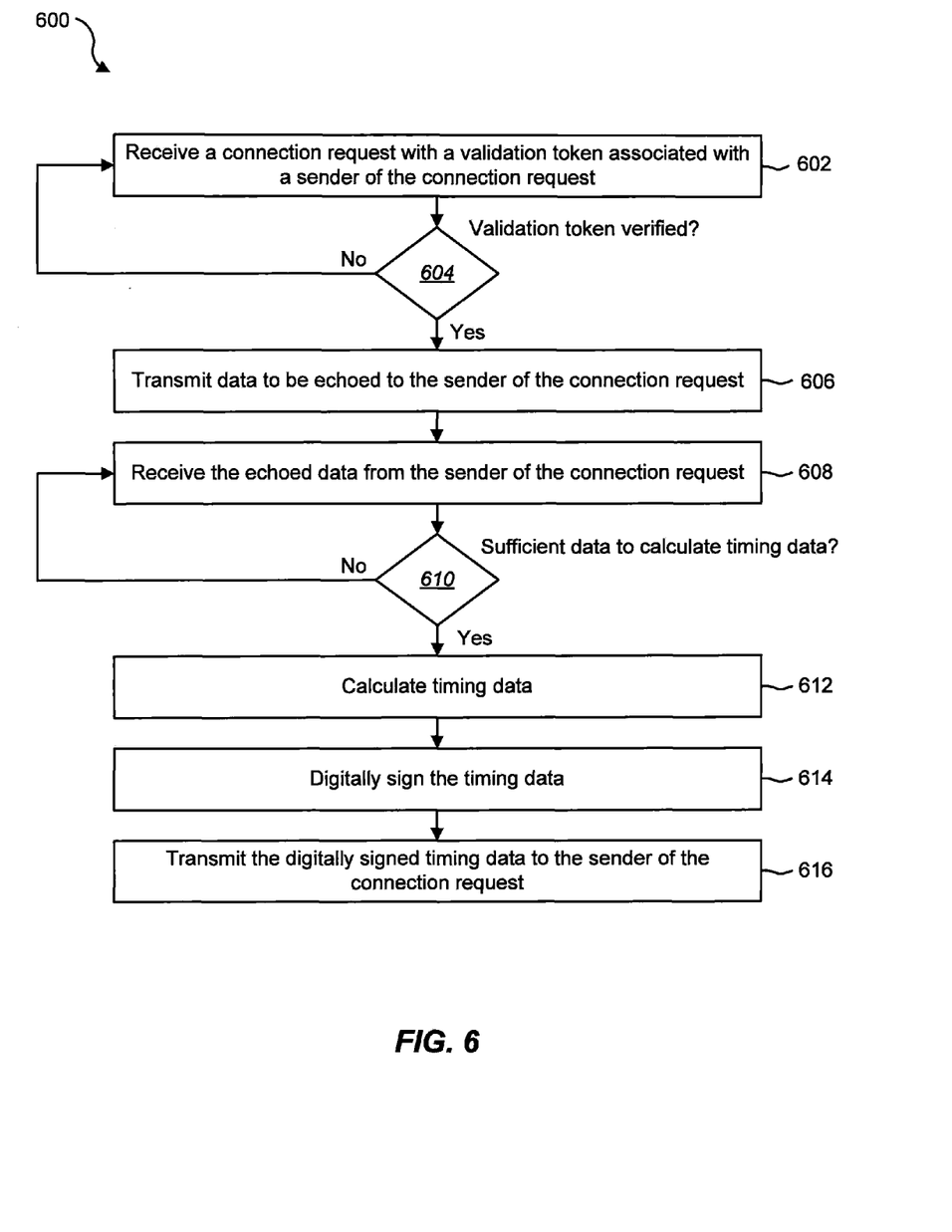
FIG. 6 is a flow chart illustrating one embodiment of a method to validate client authentication using network traffic round trip timing data.

FIG. 6 is a flow chart illustrating one embodiment of a method 600 to validate client authentication using network traffic round trip timing data. In one configuration, the method 600 may be implemented by the timing calculating module 106.

In one example, a connection request may be received 602. The connection request may include a validation token associated with a sender (e.g., a client) of the connection request. A determination 604 may be made as to whether the validation token is verified. If it is determined 604 that the validation token is not verified, the method 600 may return to receive 602 a connection request. If, however, it is determined 604 that the validation token is verified, data to be echoed may be transmitted 606 to the sender of the connection request.

In one configuration, the echoed data may be received 608 from the sender of the connection request. A determination 610 may be made as to whether sufficient data exist to calculate timing data. If it is determined 610 that sufficient data do not exist, the method 600 may return to continue to receive 608 the echoed data from the sender of the connection request. If, however, it is determined 610 that sufficient data exist to calculate timing data, timing data may be calculated 612. The timing data may indicate a round trip time to transmit the data to be echoed to the sender of the connection request and receive the echoed data from the sender of the connection request. For example, the timing data may include the mean of the round trip times required to transmit and receive the echoed data a plurality of times.

In one example, the timing data may be digitally signed 614. In one embodiment, the timing data may be digitally signed with a digital signature of a server executing the timing calculating module 106. The digitally signed timing data may be transmitted 616 to the sender of the connection request.

Figure 7:
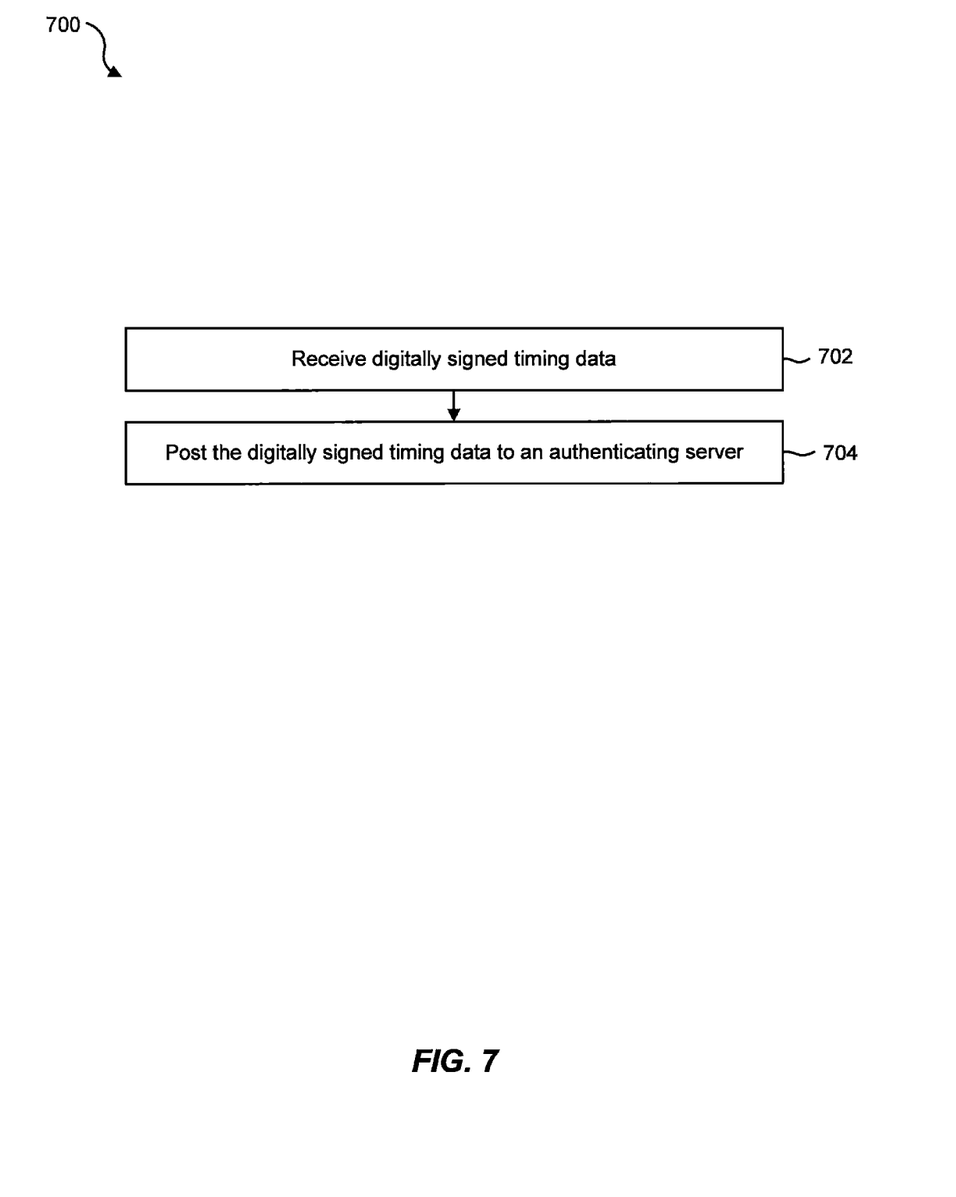
FIG. 7 is a flow chart illustrating one embodiment of a method to distribute timing data received from a timing calculating module.

FIG. 7 is a flow chart illustrating one embodiment of a method 700 to distribute timing data received from the timing calculating module 106. In one configuration, the method 700 may be implemented by the authentication web page 116. In one configuration, digitally signed timing data may be received 702. The digitally signed timing data may be posted 704 to an authenticating server 108.

Figure 8:
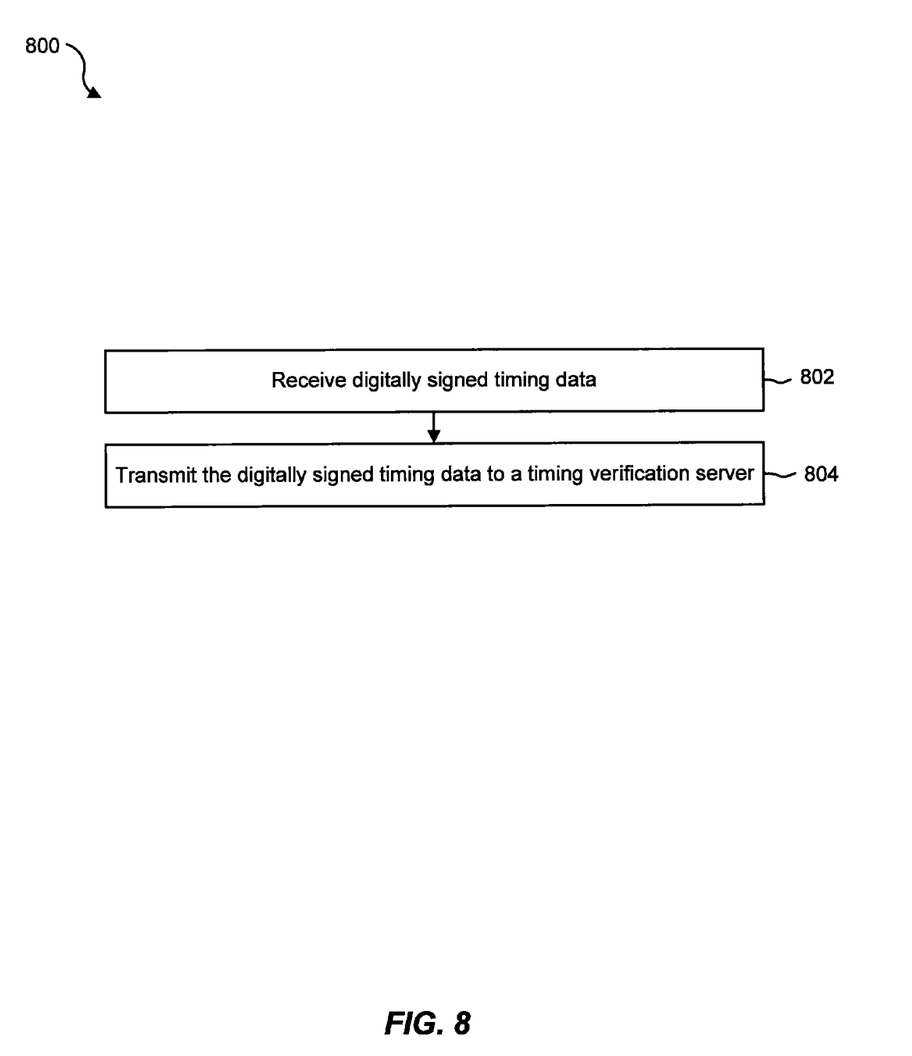
FIG. 8 is a flow chart illustrating one embodiment of a method to distribute digitally signed timing data.

FIG. 8 is a flow chart illustrating one embodiment of a method 800 to further distribute the digitally signed timing data. In one example, the method 800 may be implemented by the authenticating server 108.

Digitally signed timing data may be received 802. In one configuration, the timing data may be received 802 from the authentication web page 116. In one example, the digitally signed timing data may be transmitted 804 to a timing verification server 112.

Figure 9:
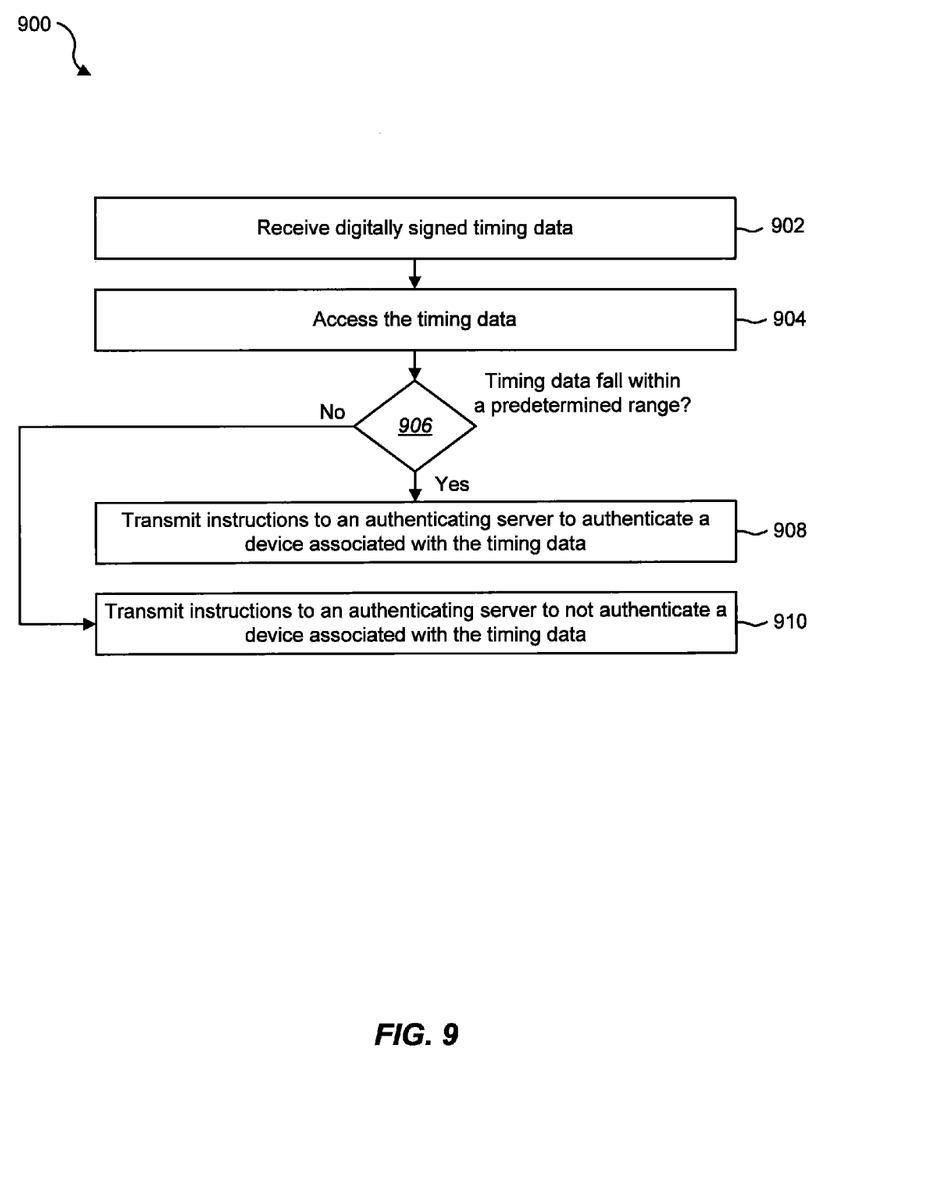
FIG. 9 is a flow chart illustrating one embodiment of a method to authenticate a validated client based on timing data.

FIG. 9 is a flow chart illustrating one embodiment of a method 900 to authenticate a validated client based on timing data. The method 900 may be implemented by the timing verification server 112.

In one configuration, digitally signed timing data may be received 902 and the timing data may be accessed 904. For example, the timing verification server 112 may gain access to the digitally signed timing data by providing a correct token or other type of credential to access the signed data. A determination 906 may be made as to whether the timing data fall within a predetermined range. For example, the timing data may include a mean of round trip times for echoed data to be transmitted and received. A determination 906 may be made as to whether the means of the round trip times fall within a certain range of round trip times. If it is determined 906 that the timing data do not fall within the predetermined range, instructions may be transmitted 910 to an authenticating server 108 to not authenticate a device associated with the timing data. For example, the authenticating server 108 may not authenticate the device that previously sent the connection request to the timing servers 104. In one embodiment, the instructions may instruct the authenticating server 108 to repeat the process, require other forms of authentication (e.g., secret questions, a Completely Automated Public Turing test to tell Computers and Humans Apart (CAPTCHA) prompt, etc.). In addition, the instructions may instruct the authenticating server 108 to transmit a secret value to the device requesting authentication via a short message server (SMS) message. The instructions may further instruct the authenticating server 108 to reduce functionality for that particular device requesting authentication for a particular session.

If, however, it is determined 906 that the timing data do fall within the predetermined range, instructions may be transmitted 908 to the authenticating server 108 to authenticate the device associated with the timing data. In other words, the sender of the connection request may be authenticated and allowed to access data.

Communications between the various devices and modules described above may be over HTTPS to protect the integrity of the validation token 328. In one embodiment, client devices that authenticate programmatically may perform similar operations as those described above.

In one embodiment, the connection between the authenticating server 108, the timing servers 104, and the issuing server 110 may use mutual certificate authentication over HTTPS (or some similarly secure transport). The connection may be a persistent connection. Expiry of the validation token 328 may be controlled by the issuing server 110.

In one configuration, the predetermined range of acceptable timings may be determined by creating an initial timing on registration of the client device 102 and periodically retiming (e.g., reissuing a hard token). In one example, to determine a range of acceptable timings, spiders may attempt to ping IP addresses clients have authenticated from in the past. The time needed to receive a response from the ping may provide an acceptable timing approximation even if the final IP address is not reached. Successful or unsuccessful validations may be used to populate a database of timings.

In one embodiment, the timing data 534 may be sent directly to the timing verification server 112 from the timing servers 104. The verification server 112 may transmit an acknowledgement to the client device 102. When all acknowledgements have been received by the client device 102, the client 102 may inform the authenticating server 108. The authenticating server may query the timing verification server 112 whether the timings (included in the timing data) are correct. This may require an authenticated connection between the timing servers 104 and the timing verification server 112. In addition, the timing verification server 112 may send the timings down using a persistent HTTPS connection with mutual certificate authentication.

In one configuration, the timing data 534 may not be handled by the client 102 and the authenticating server 108. This may decrease the risk of the timing data 534 being tampered with since other standards like WS-Trust and SAML may pass keys and similar data back through the client 102. The timing verification server 112, however, may maintain a state for the timing data 534.

In one example, the timing data 534 may be encrypted to prevent the authenticating server 108 from accessing the timings. The data 534 may be encrypted using a public key associated with the timing verification server's 112 digital certificate. The random echo data 530 transmitted by the timing servers 104 to the client 102 may be encrypted data from the individual timing server 104 that includes the previous timing results. This may reduce or eliminate the need for the timing servers 104 to maintain state.

In one embodiment, the timing servers 104 may exclude unusually high or low timings or otherwise use a more complex approach to arrive at a more reliable time. The authenticating server 108 may identify the user of the client 102 individually or an expected location to the timing verification server 112.

Figure 10:
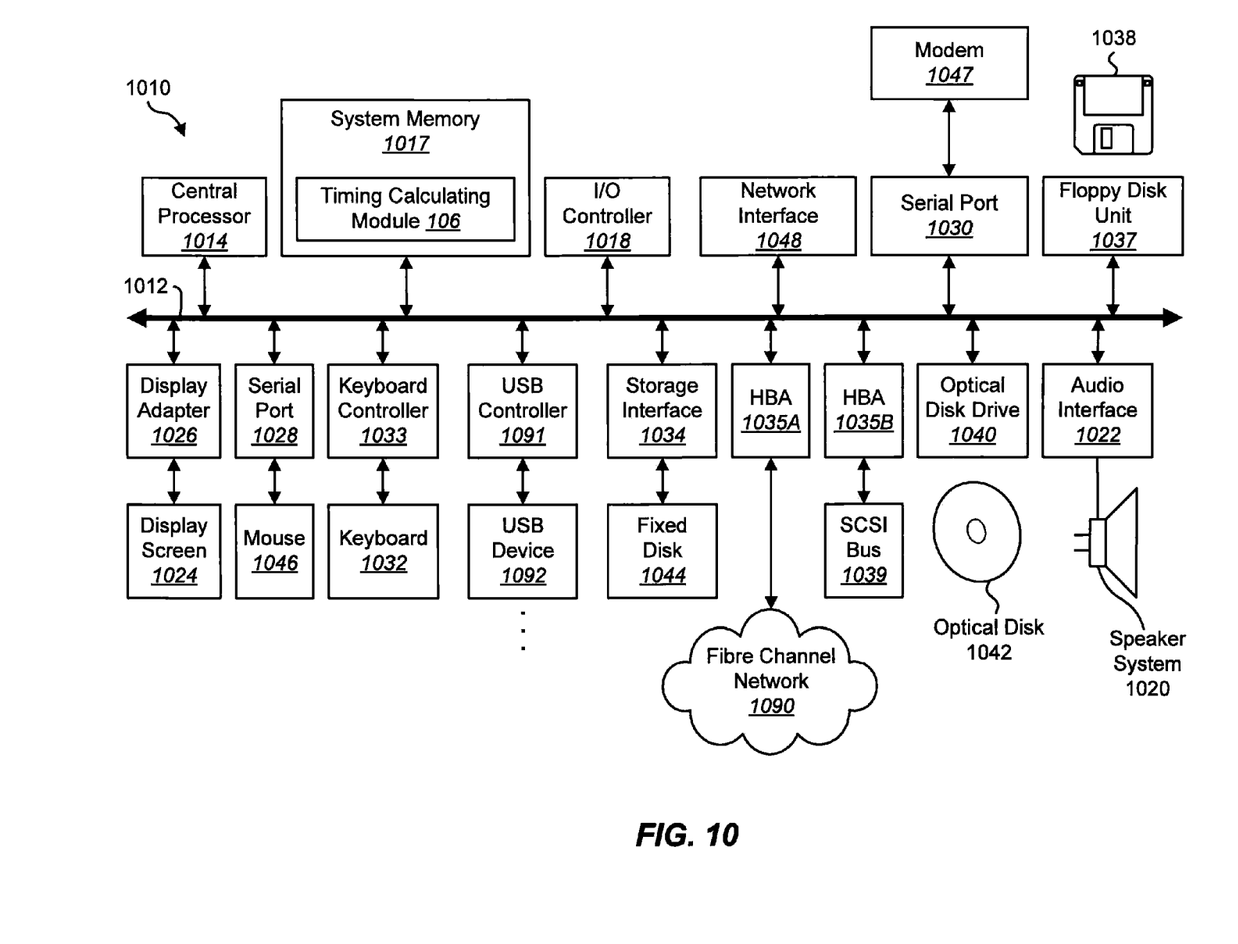
FIG. 10 depicts a block diagram of a computer system suitable for implementing the present systems and methods.

FIG. 10 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1091), a storage interface 1034, a floppy disk unit 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the timing calculation module 106 to implement the present systems and methods may be stored within the system memory 1017. Applications resident with computer system 1010 are generally stored on and accessed via a non-transitory computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
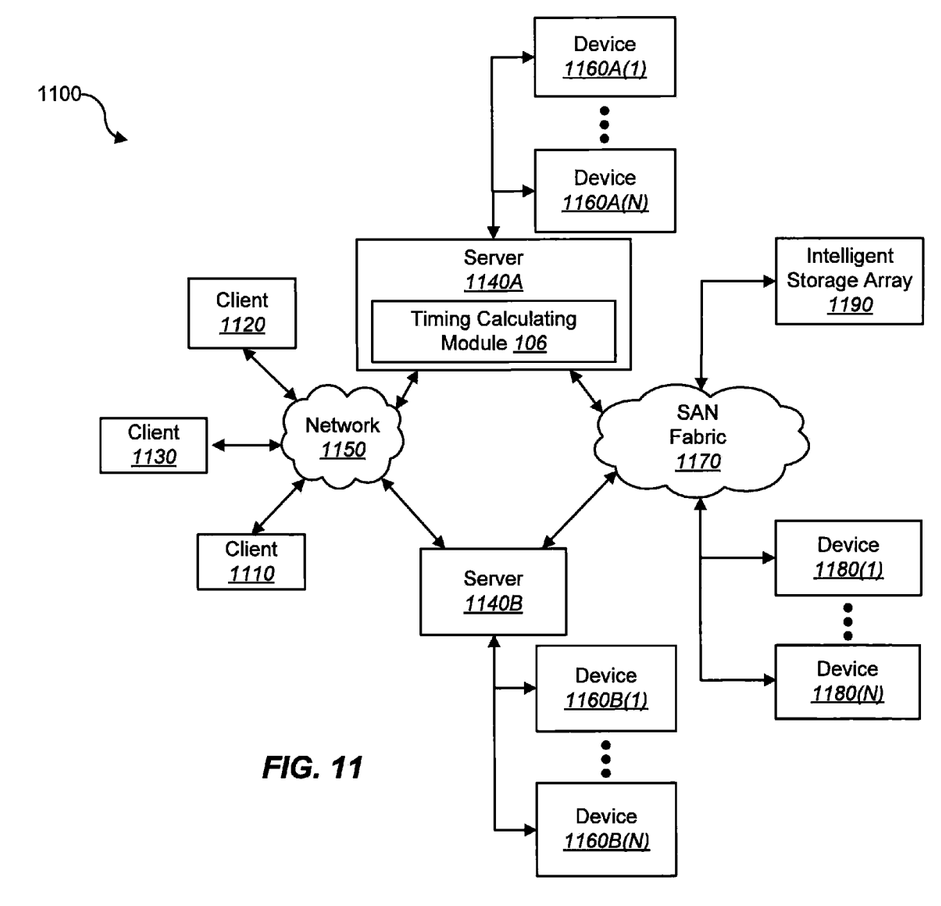
FIG. 11 is a block diagram depicting a network architecture in which client systems, as well as storage servers (any of which can be implemented using computer system), are coupled to a network.

FIG. 11 is a block diagram depicting a network architecture 1100 in which client systems 1110, 1120 and 1130, as well as storage servers 1140A, 1140B (any of which can be implemented using computer system 1110), are coupled to a network 1150. In one embodiment, the timing calculation module 106 may be located within the storage servers 1140A, 1140B to implement the present systems and methods. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A, 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to validate client authentication using timing data, comprising:
  authenticating credentials entered by a user on a client;
  upon authenticating the credentials entered by the user, validating the client authentication using timing data, comprising:
    receiving, by a processor, a connection request from the client, the connection request comprising a request to connect the client to an Internet-based resource, the credentials being authenticated and the client authentication being validated using timing data to determine whether to allow the client to connect to the Internet-based resource;
    receiving, by the processor, a validation token with the connection request;
    verifying, by the processor, the received validation token with an issuing server by matching the received validation token with a validation token generated by the issuing server;
    calculating, by the processor, timing data that indicate a time to transmit the data to the client and receive the retransmitted data from the client;
    applying, by the processor, a protective element to the timing data, wherein the protective element comprises a digital signature;
    transmitting, by the processor, data to the client, wherein the client retransmits the data, and wherein the data comprises the digitally signed timing data;
    receiving, by the processor, the retransmitted data from the client; and
    transmitting the digitally signed timing data to a timing verification server, wherein the timing verification server determines whether the timing data fall within a predetermined range of timing data.

2. The method of claim 1, wherein the validation token is associated with the client.

3. The method of claim 2, further comprising establishing a connection with the issuing server, wherein the issuing server generates validation tokens.

4. The method of claim 1, further comprising transmitting a key value pair, wherein the key value pair is protected by the digital signature.

5. The method of claim 4, wherein the key value pair comprises a validation token associated with the client and the timing data.

6. A computing device configured to validate client authentication using timing data, comprising:
  a processor;
  memory in electronic communication with the processor; and
  instructions stored in the memory, the instructions being executable by the processor to:
    authenticate credentials entered by a user on a client;
    upon authenticating the credentials entered by the user, validate the client authentication using timing data, comprising:
      receive a connection request from the client, the connection request comprising a request to connect the client to an Internet-based resource, the credentials being authenticated and the client authentication being validated using timing data to determine whether to allow the client to connect to the Internet-based resource;
      receive a validation token with the connection request;
      verify the received validation token with an issuing server by matching the received validation token with a validation token generated by the issuing server;
      calculate timing data that indicate a time to transmit the data to the client and receive the retransmitted data from the client;
      apply a protective element to the timing data;
      transmit data to the client, wherein the client retransmits the data, and wherein the data comprises the digitally signed timing data;
      receive the retransmitted data from the client; and
      transmit the digitally signed timing data to a timing verification server, wherein the timing verification server determines whether the timing data fall within a predetermined range of timing data.

7. The computing device of claim 6, wherein the validation token is associated with the client.

8. The computing device of claim 7, wherein the instructions are executable by the processor to establish a connection with the issuing server, wherein the issuing server generates validation tokens.

9. The computing device of claim 6, wherein the instructions are executable by the processor to transmit a key value pair, wherein the key value pair is protected by the digital signature.

10. The computing device of claim 9, wherein the key value pair comprises a validation token associated with the client and the timing data.

11. A computer-program product to validate client authentication using timing data, the computer-program product comprising a non-transitory computer-readable medium having instructions thereon, the instructions being executable by a processor to:
  authenticate credentials entered by a user on a client;
  upon authenticating the credentials entered by the user, validate the client authentication using timing data, comprising:
    receive a connection request from the client, the connection request comprising a request to connect the client to an Internet-based resource, the credentials being authenticated and the client authentication being validated using timing data to determine whether to allow the client to connect to the Internet-based resource;
    receive a validation token with the connection request;

verify the received validation token with an issuing server by matching the received validation token with a validation token generated by the issuing server;
calculate timing data that indicate a time to transmit the data to the client and receive the retransmitted data from the client;
apply a protective element to the timing data;
transmit data to the client, wherein the client retransmits the data, and wherein the data comprises the digitally signed timing data;
receive the retransmitted data from the client; and
transmit the digitally signed timing data to a timing verification server, wherein the timing verification server determines whether the timing data fall within a predetermined range of timing data.

\* \* \* \* \*